(12) United States Patent
Jacobs

(10) Patent No.: US 8,910,680 B1
(45) Date of Patent: Dec. 16, 2014

(54) FLAT SCREEN DUST COVER

(76) Inventor: Jermaine Jacobs, Wappinger Falls, NY (US)

(*) Notice: Subject to any disclaimer, the term of this patent is extended or adjusted under 35 U.S.C. 154(b) by 404 days.

(21) Appl. No.: 13/008,137

(22) Filed: Jan. 18, 2011

(51) Int. Cl.
*B65D 65/02* (2006.01)

(52) U.S. Cl.
USPC .......................................... 150/165; 206/320

(58) Field of Classification Search
USPC .............. 150/154, 165; 312/7.2; 206/320
See application file for complete search history.

(56) References Cited

U.S. PATENT DOCUMENTS

| | | | | |
|---|---|---|---|---|
| 4,685,499 A * | 8/1987 | Black | ............................. | 150/154 |
| D382,260 S * | 8/1997 | Smith | ........................... | D14/448 |
| 5,772,293 A * | 6/1998 | Hughes | ....................... | 312/208.3 |
| 5,812,188 A * | 9/1998 | Adair | ............................... | 348/77 |
| 5,894,878 A * | 4/1999 | Morgan et al. | ................ | 160/354 |
| 6,209,973 B1 * | 4/2001 | Steinberg | ........................ | 312/7.2 |
| 6,267,236 B1 * | 7/2001 | Seok | .............................. | 206/320 |
| 6,402,269 B1 * | 6/2002 | Roth | ............................... | 312/7.2 |
| D567,245 S * | 4/2008 | Edwards | ...................... | D14/448 |
| D634,327 S * | 3/2011 | Connard | ....................... | D14/448 |
| 2002/0053861 A1 * | 5/2002 | Steinberg | ........................ | 312/7.2 |
| 2005/0189247 A1 * | 9/2005 | Traugh | ........................... | 206/320 |
| 2006/0274489 A1 * | 12/2006 | Hawkins | ....................... | 361/683 |

* cited by examiner

*Primary Examiner* — Sue A Weaver

(57) ABSTRACT

The flat screen dust cover is a dust cover specifically suited for flat panel televisions having a relatively thin profile. The flat screen dust cover is manually placed over the television in order to prevent the accumulation of dust onto or within the television. The flat screen dust cover is placed onto the television between uses, and covers a top, front display surface, rear, and sides of the television. The flat screen dust cover features a cutout along a bottom, rear side of said dust cover, which is used to enable ingress and egress of a stand, mounting hardware, or wiring there from.

5 Claims, 4 Drawing Sheets

FLAT SCREEN DUST COVER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of television covers, more specifically, a dust cover specifically adapted for use with flat screen televisions.

With the advent of Plasma and LCD televisions, the sizes of televisions are becoming less in terms of width, which is desirable. Needless to say, these televisions come at a premium as with any new electronic device. These new televisions collect dust like anything else, which can enter into the interior of the housing of said televisions and cause damage.

The present invention seeks to improve upon this dilemma by providing an end user with an accessory that fits over these televisions to prevent dust from collecting on or inside of said televisions.

B. Discussion of the Prior Art

As will be discussed immediately below, no prior art discloses a dust cover that is specifically designed to be draped onto a flat panel television; wherein the dust cover when placed over said television covers the top, sides, front display surface, and rear surface in order to prevent the accumulation of dust onto or within said television; wherein the dust cover features a cutout along a bottom, rear side of said dust cover, which is used to enable ingress and egress of a stand, mounting hardware, or wiring there from.

The Pecorino Patent (U.S. Pat. No. 5,264,765) discloses a cover unit for a flat panel video display, for deploying a flexible cover. However, the unit is mounted on a wall and includes means for deploying upon a television as opposed to a dust cover that is manually draped over a top, front, and rear sides of a television in order to prevent the accumulation of dust thereon.

The Nakamatsu Patent (U.S. Pat. No. 5,754,259) discloses an optical filter for visual display terminals. However, the filter is designed to work in conjunction with a display and is not suited for draping atop a television in order to prevent the accumulation of dust when not in use.

The Mylar Patent (U.S. Pat. No. 6,846,083) discloses a television screen cover. Again, the screen cover is mounted on a on a television and of which only covers the screen as opposed to a dust cover that is manually draped over a top, front, and rear sides of a television in order to prevent the accumulation of dust thereon.

The Yoon Patent Application Publication (U.S. Pub. No. 2006/0000135) discloses a decorative assembly that can be attached to a thin panel display screen. However, the decorative assembly is designed to cover the display of the television and overlaps on corners of said television in order to support itself thereon; as opposed to a dust cover that slides over the top, front, rear, and sides of said television in order to prevent the accumulation of dust thereon or therein.

While the above-described devices fulfill their respective and particular objects and requirements, they do not describe a dust cover that is specifically designed to be draped onto a flat panel television; wherein the dust cover when placed over said television covers the top, sides, front display surface, and rear surface in order to prevent the accumulation of dust onto or within said television; wherein the dust cover features a cutout along a bottom, rear side of said dust cover, which is used to enable ingress and egress of a stand, mounting hardware, or wiring there from. In this regard, the flat screen dust cover departs from the conventional concepts and designs of the prior art.

SUMMARY OF THE INVENTION

The flat screen dust cover is a dust cover specifically suited for flat panel televisions having a relatively thin profile. The flat screen dust cover is manually placed over the television in order to prevent the accumulation of dust onto or within the television. The flat screen dust cover is placed onto the television between uses, and covers a top, front display surface, rear, and sides of the television. The flat screen dust cover features a cutout along a bottom, rear side of said dust cover, which is used to enable ingress and egress of a stand, mounting hardware, or wiring there from.

An object of the invention is to provide a dust cover that is specifically suited for use with flat panel televisions that have a thin profile and of which are either wall mounted or rest upon a stand.

A further object of the invention is to provide a flat screen dust cover that can be easily installed or removed from the television between uses.

A further object of the invention is to provide a flat screen dust cover that covers the top, sides, front display surface, and rear surface.

A further object of the invention is to provide a flat screen dust cover that includes the cutout that does not obstruct or contact wall-mount hardware, a stand, or wiring that is connected on a rear surface of the television.

A further object of the invention is to provide a flat screen dust cover that is made of a lightweight material that is flexible and impermeable.

These together with additional objects, features and advantages of the flat screen dust cover will be readily apparent to those of ordinary skill in the art upon reading the following detailed description of presently preferred, but nonetheless illustrative, embodiments of the flat screen dust cover when taken in conjunction with the accompanying drawings.

In this respect, before explaining the current embodiments of the flat screen dust cover in detail, it is to be understood that the flat screen dust cover is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the flat screen dust cover.

It is therefore important that the claims be regarded as including such equivalent construction insofar as they do not depart from the spirit and scope of the flat screen dust cover. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 4 illustrates a rear view of the flat screen dust cover installed upon a television and detailing the cutout that accommodates the stand and wires exiting there through.

DETAILED DESCRIPTION OF THE EMBODIMENT

Figure 1:
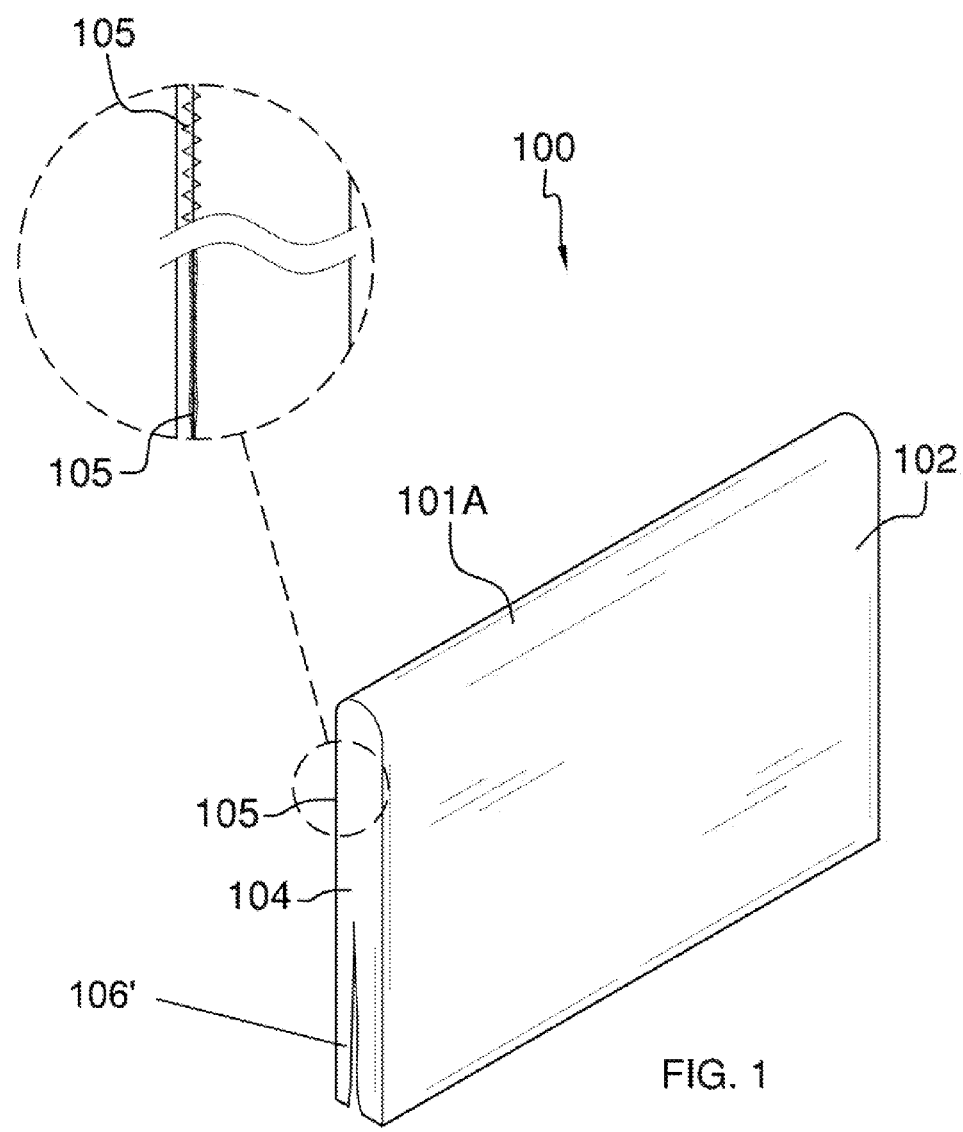
FIG. 1 illustrates a front, isometric view of the flat screen dust cover by itself.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-5. A flat screen dust cover 100 (hereinafter invention) is composed of a main body 101 that is bended about a middle portion 101A to form a "U" shaped profile consisting of a front 102 and a rear 103. Sides 104 are attached on each end of the front 102 and the rear 103 in order to form a cavity into which a flat panel television 130 (hereinafter television) is placed.

The sides 104 and the main body 101 may be made of a material comprising a flexible fabric, plastic, rubber, nylon, polyester, or cotton. The material of the sides 104 and the main body 101 shall be of suitable thickness and durability so as to prevent dust from collecting on or within the television 130. Furthermore, it may be desirable to select a material that is impermeable that will prevent dust and liquids from entering at atop or from a side of the invention 100. The sides 104 are attached to the main body 101 or the front 102 and the rear 103 by attaching means 105. The attaching means 105 may comprise stitching the parts together, adhesive, or molding the parts together (plastic or rubber).

The rear 103 has a cutout 106 that is centrally located along a bottom edge 103A. The cutout 106 has a width 106A by a height 106B. The cutout 106 enables a television stand 131 and/or wiring 132 (see FIG. 4) or wall-mount hardware 133 (see FIG. 5) to be unobstructed by the invention 100. It shall be noted that the cutout 106 is depicted as a triangular extraction from the rear 103, but may alternatively include other shapes comprising of rectangular, square, or cutouts including curves.

The invention 100 is designed to cover a front display surface 130A, top 130B, sides 130C, and a majority of a rear surface 130D of the television 130. The invention 100 includes a bottom opening 107 that enables the invention 100 to be placed onto or removed from the television 130 (see FIG. 3).

The middle portion 101A and the sides 104 shall have a width (see FIG. 5) that accommodates the television 130. That being said, the television 130 may have an overall width ranging from less than 1 inch to not more than 5 inches. Furthermore, it shall be noted that the overall width and height of the invention 100 may range in sizes in order to accommodate differently sized televisions.

It shall be further noted that the size of the cutout 106 (the width 106A by the height 106B) shall be in proportion to the size of the television 130 and the applicable stand 131 and/or wall-mount hardware 133. However, the width 106A and the height 1068 of the cutout 106 shall be not less than 2 inches and not more than 8 inches.

Figure 2:
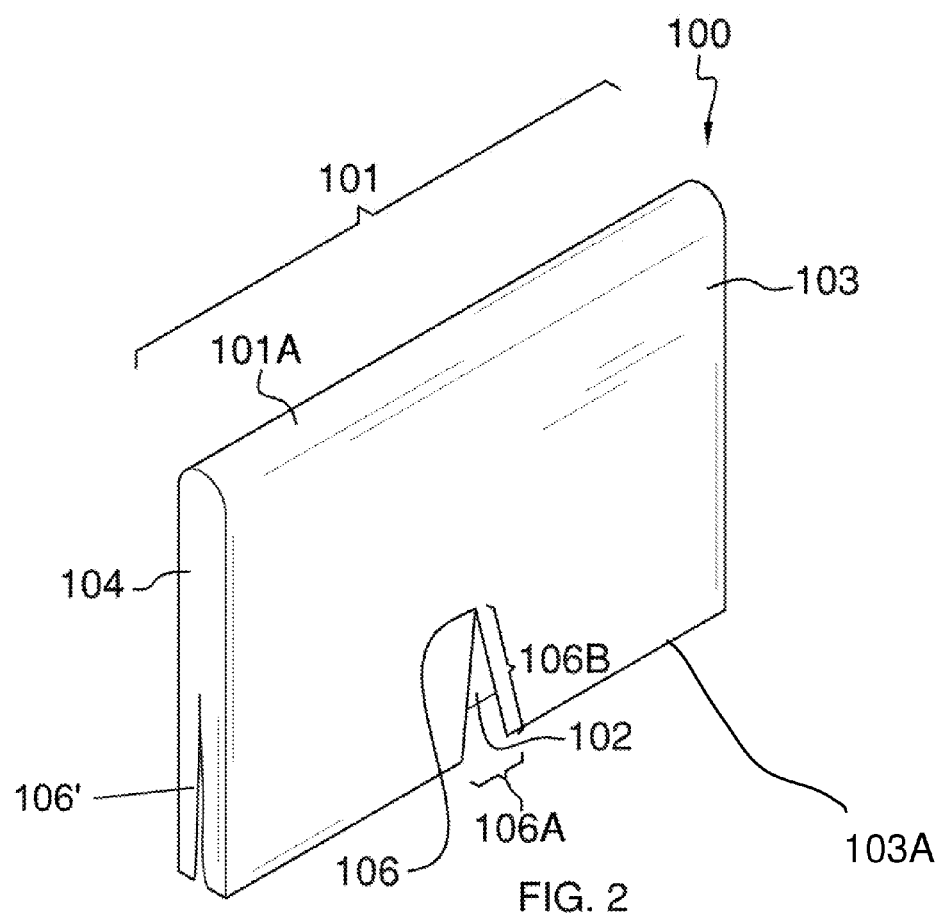
FIG. 2 illustrates a rear, isometric view of the flat screen dust cover by itself and detailing a cutout that accommodates a stand and/or wiring to remain intact and unobstructed by the flat screen dust cover.
Figure 3:
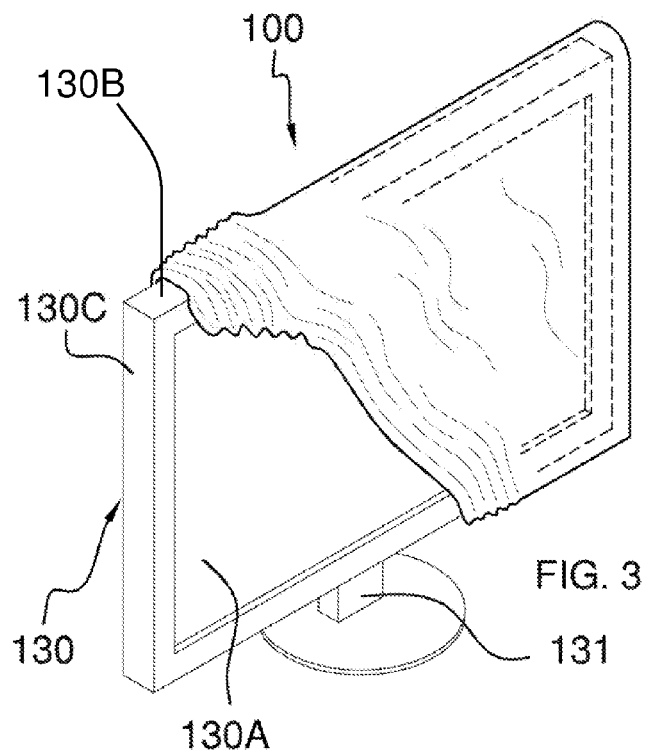
FIG. 3 illustrates a view of the flat screen dust cover being placed over or removed from a television.
Figure 4:
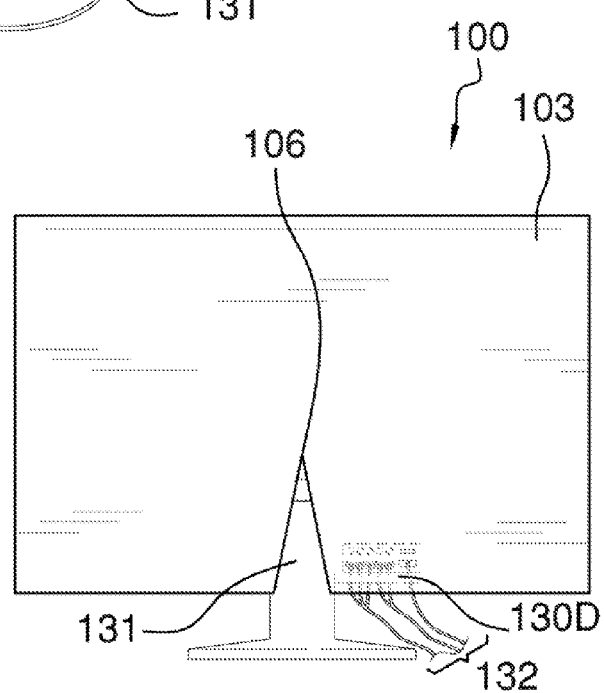
Figure 5:
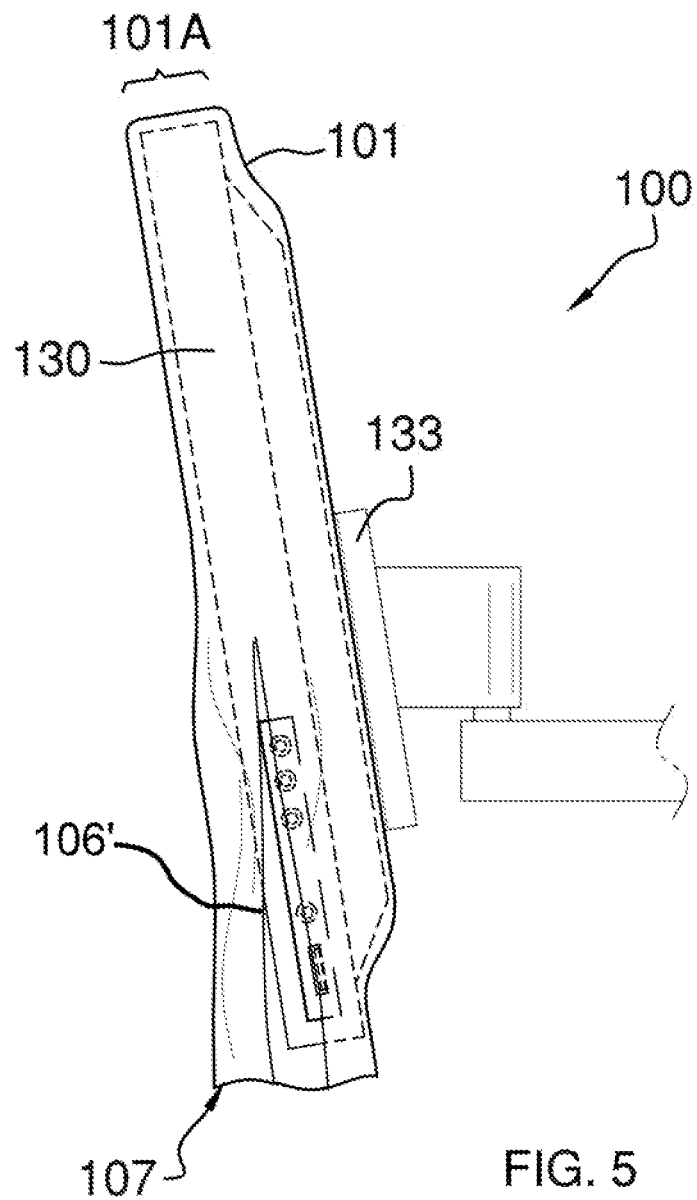
FIG. 5 illustrates a side view of the flat screen dust cover installed upon a television mounted to a wall bracket, and further detailing a cutout along a side thereon.

Referring to FIGS. 1, 2, and 5, a side cutout 106' is included, and enables connectivity to occur to a side of the television 130. The side cutout 106' has all of the same attributes as the cutout 106 on the rear 103 mentioned above with only consideration being taken for the width of the sides. It shall also be noted that the side cutout 106' may be located on a left and/or right side of the invention 100.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A flat screen dust cover accessory comprising:
    a main body that is bent about a middle portion to form a "U" shaped profile and of which sides attach via attaching means to form a cavity having a bottom opening for placement onto a flat panel television in order to prevent the accumulation of dust thereon or therein;
    a cutout is included on a rear to prevent obstruction of a stand, wiring, or a wall-mount hardware to the television;
    wherein the main body is further composed of a front;
    wherein the cutout is centrally located along a bottom edge of the rear and is further defined by a width and by a height;
    wherein the width and the height of the cutout shall be not less than 2 inches and not more than 8 inches;
    wherein a side cutout is included on at least one side of the flat screen dust cover;
    wherein the main body and the sides are made of a material comprising a flexible fabric, plastic, rubber, nylon, polyester, or cotton;
    wherein the attaching means comprise stitching the, adhesive, or molding.

2. The flat screen dust cover as described in claim 1 wherein the material is impermeable.

3. The flat screen dust cover as described in claim 1 wherein the sides and the middle portion shall have a width of not less than 1 inch to not more than 5 inches.

4. A flat screen dust cover accessory comprising:
- a main body that is bent about a middle portion to form a "U" shaped profile and of which sides attach via attaching means to form a cavity having a bottom opening for placement onto a flat panel television in order to prevent the accumulation of dust thereon or therein;
- wherein the dust cover is specifically shaped to cover a top, front display surface, sides, and a majority of a rear surface of said flat panel television;
- wherein the main body is further composed of a front and a rear that attach to said sides;
- a side cutout is included on at least one side of the flat screen dust cover;
- wherein a cutout is included on the rear to prevent obstruction of a stand, wiring, or a wall-mount hardware to the television;
- wherein the cutout is centrally located along a bottom edge of the rear and is further defined by a width and by a height; wherein the width and the height of the cutout shall be not less than 2 inches and not more than 8 inches;
- wherein the main body and the sides are made of a material comprising a flexible fabric, plastic, rubber, nylon, polyester, or cotton;
- wherein the attaching means comprise stitching the, adhesive, or molding;
- wherein the material is impermeable.

5. A flat screen dust cover accessory comprising:
- a main body that is bent about a middle portion to form a "U" shaped profile and of which sides attach via attaching means to form a cavity having a bottom opening for placement onto a flat panel television in order to prevent the accumulation of dust thereon or therein;
- wherein the dust cover is specifically shaped to cover a top, front display surface, sides, and a majority of a rear surface of said flat panel television;
- wherein the main body is further composed of a front and a rear that attach to said sides;
- wherein a cutout is included on the rear to prevent obstruction of a stand, wiring, or a wall-mount hardware to the television;
- wherein the cutout is centrally located along a bottom edge of the rear and is further defined by a width and by a height; wherein the width and the height of the cutout shall be not less than 2 inches and not more than 8 inches;
- a side cutout is included on at least one side of the flat screen dust cover;
- wherein the sides and the middle portion shall have a width of not less than 1 inch to not more than 5 inches;
- wherein the main body and the sides are made of a material comprising a flexible fabric, plastic, rubber, nylon, polyester, or cotton;
- wherein the attaching means comprise stitching the, adhesive, or molding;
- wherein the material is impermeable.

\* \* \* \* \*